| United States Patent [19] | [11] 3,797,476 |
|---|---|
| Tarcici | [45] Mar. 19, 1974 |

[54] SOLAR HEATING DEVICE

[76] Inventor: Adnan Tarcici, 13, Avenue de Bude, 1202 Geneva, Switzerland

[22] Filed: Mar. 19, 1973

[21] Appl. No.: 342,365

[52] U.S. Cl. .................. 126/270, 350/293, 350/299
[51] Int. Cl. ............................................... F24j 3/02
[58] Field of Search ............ 126/270, 271; 350/293, 350/299

[56] References Cited
UNITED STATES PATENTS

| 2,586,583 | 2/1952 | Wagner | 126/270 UX |
| 2,760,482 | 8/1956 | Tarcici | 126/270 |
| 2,770,230 | 11/1956 | Tarcici | 126/270 |
| 2,798,478 | 7/1957 | Tarcici | 126/270 |
| 2,909,171 | 10/1959 | Lof | 126/270 |

*Primary Examiner*—Carroll B. Dority, Jr.
*Assistant Examiner*—Peter D. Ferguson
*Attorney, Agent, or Firm*—Robert E. Burns; Emmanuel J. Lobato

[57] ABSTRACT

A solar heating device comprising an upright tubular post, a rigid support member protruding perpendicularly from the post, and a generally paraboloidal reflector having a rigid arm extending along the axis of the reflector from the center thereof towards the focal point. A pivot perpendicular to a free end of said arm is selectively pivotally mounted and secured in one of a plurality of notches in said support member to provide a compensation for the lateral displacement of the focal point as the reflector is tilted. A height adjustable grid mounted on a tube slidably received within the post enables the support of an object to be heated. A rod indicating the focal point of the reflector can be disposed along the axis thereof.

9 Claims, 8 Drawing Figures

PATENTED MAR 19 1974  3,797,476

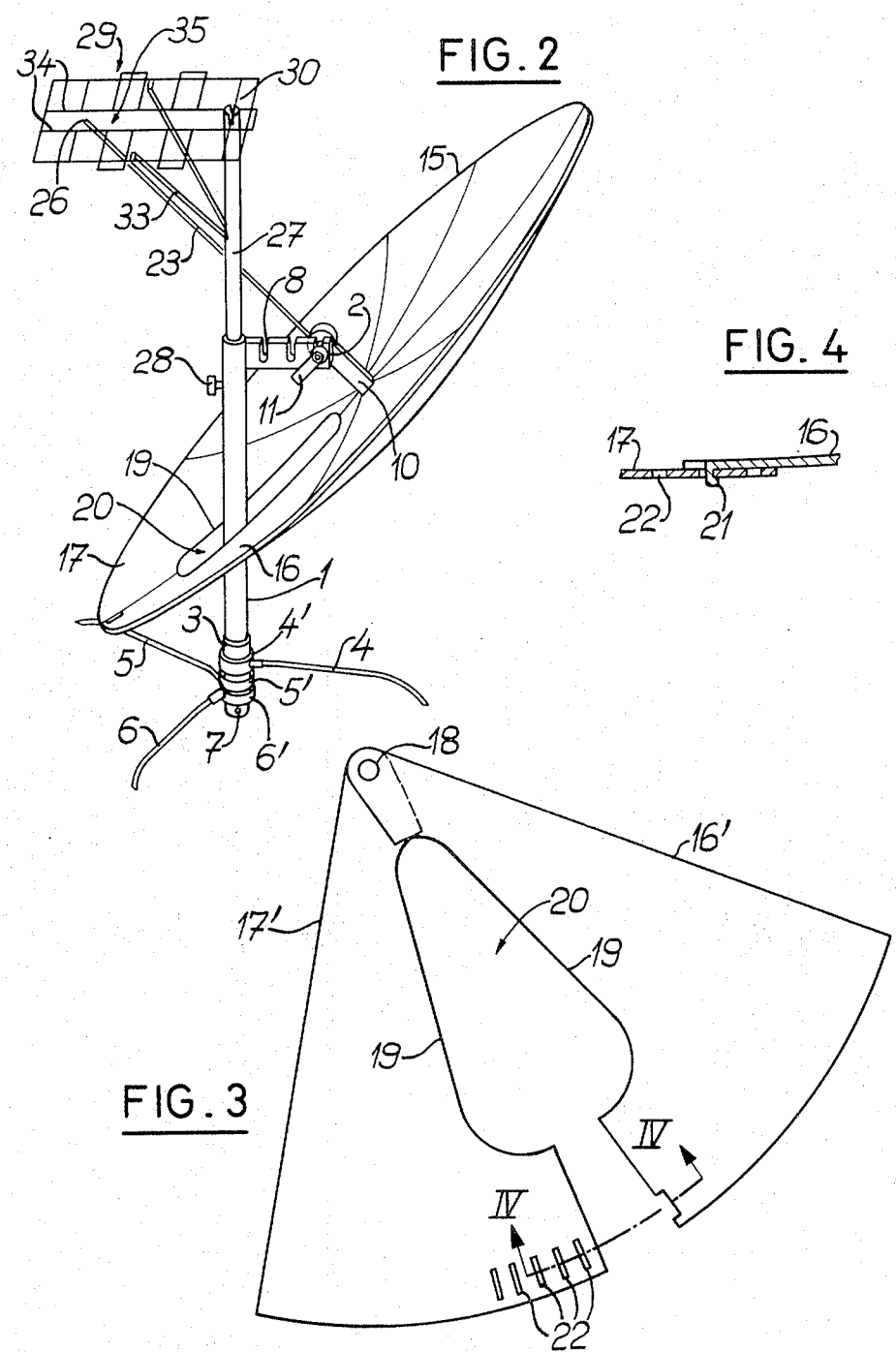

SOLAR HEATING DEVICE

The present invention relates to solar heating devices including a generally paraboloidal reflector adapted to concentrate the rays of the sun within a given area so as to heat an article located in this area.

Such devices are already known from my prior U.S. Pat. Nos. 2,760,482, 2,770,229, 2,770,230 and 3,643,648. A problem encountered with these devices is to keep the concentrated rays focussed on an article being heated since as the sun changes position, and unless the orientation and/or curvature of the reflector are modified, the focus of the rays moves along an arcuate path and it is accordingly necessary to adjust the position of the article being heated. It is furthermore necessary, in order to obtain the maximum heating effect, to align the axis of the reflector along the direction of the sun's rays whereby the rays are concentrated at the axial focal point of the reflector. Any inclination of the axis of the reflector away from this ideal direction reduces the amount of incident light, and the reflected light is concentrated at a focus lying off the axis of the reflector; as a consequence, the heating effect is reduced, this reduction becoming increasingly important for large angles of incidence.

For the sake of convenience, in the following description, the term "focal point" will be used to designate the point along the axis of the reflector to which a beam of light parallel to the axis of the reflector is concentrated; the term "focus" will be used to designate other points to which any parallel beams of light inclined to the axis of the reflector are concentrated.

My U.S. Pat. No. 3,643,648 has already suggested providing solar heating devices having two foldable semi-paraboloidal reflectors with means for adjusting the focal points of the two reflectors. This arrangement has been found to operate satisfactorily, and in particular enables a maximum heating effect to be obtained by appropriate orientation of the reflectors and adjustment of their focal lengths, but the manufacturing cost of the devices is relatively high.

The specification of my expired U.S. Pat. No 2,770,230 describes, with reference to FIG. 3 thereof, a solar heating device of relatively simpler construction including a single paraboloidal reflector with a constant curvature, and which is pivotally mounted about a pin located at the center of the reflector. The pivoting pin is supported at the outer end of a fixed bar protruding perpendicularly from a sleeve which can be fixed along an upright supporting post, the axis of the pivoting pin being perpendicular to the axis of said post. The upright post also carries, at its upper end, a plate for supporting an object to be heated, the height of this plate being adjustable. With this device, as the orientation of the reflector is modified, for example to compensate for a change of the angle of the sun to the horizontal, the height of the support plate is adjusted to maintain the supported object at the focus. However, the displacement of said focus (and of the focal point) has a non-negligible component perpendicular to the axis of the upright post, and the range of possible adjustment of the angular inclination of the reflector is therefore limited by the size of the support plate. This considerably limits the possibilities of use of the device, particularly when the sun is relatively low on the horizon, since in addition to the fact that sun's rays are weaker, the axis of the reflector has to be inclined at a large angle to the direction of the sun in order to focus the rays on the support plate, thereby considerably reducing the amount of incident light and the heating power of the device.

It is therefore an object of the invention to provide a solar heating device which can be of relatively simple construction, and in which a substantially paraboloidal reflector is pivotally mounted in a manner to reduce the transversal displacement of the focal point of the reflector relative to a support when the reflector is tilted, thereby enhancing the possibilities of use of the device.

According to the invention, there is provided a solar heating device including a post, a rigid support member extending transversally of the post, and a concave generally paraboloidal reflector having a rigid arm extending along the axis of the reflector from the center thereof towards the focal point. Means are provided for pivotally mounting the arm to said support member about a pivoting axis perpendicular to the axes of said post and said reflector whereby the reflector can be oriented relative to the post, said pivoting axis being spaced apart from the center of the reflector towards the focal point of the reflector. Said post carries towards an upper end thereof means for supporting an object to be heated, and means are provided for adjusting the relative position of said object supporting means and said support member along the axial direction of said post.

A specific embodiment of a device according to the invention will now be described, by way of example, with reference to the accompanying drawings, in which:

FIG. 2 is a view similar to FIG. 1, but with the device shown in a second position;

FIG. 3 is a schematic plan view of a part of a varied form of reflector during unfolding thereof;

FIG. 4 is a cross-section taken along line IV—IV of FIG. 3, when the reflector is fixed in an expanded position;

Figure 1:
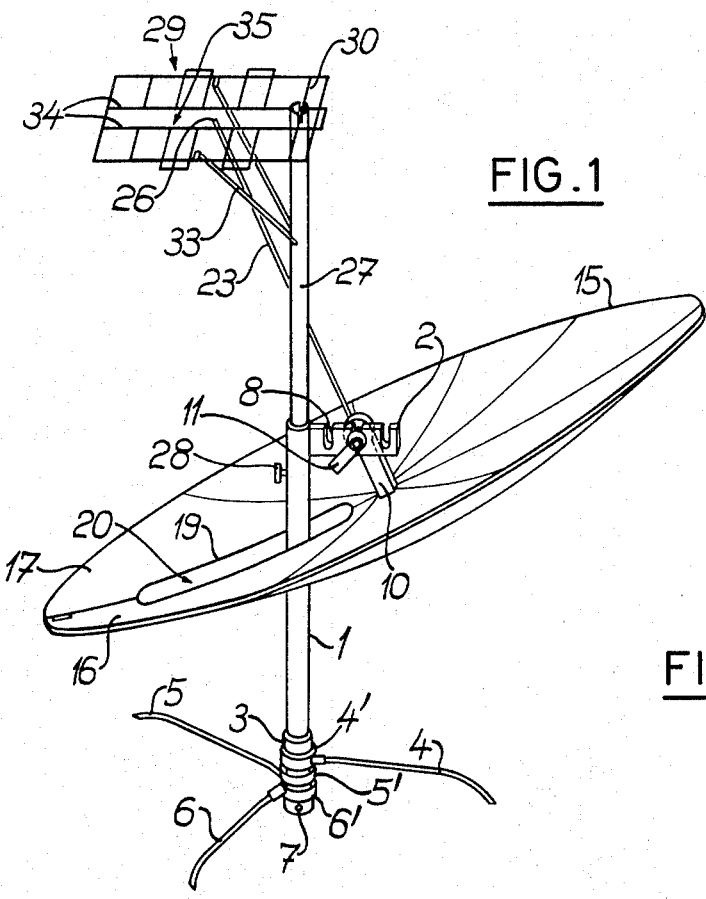
FIG. 1 is a schematic perspective view of the device assembled ready for use in a first position.
Figure 6:
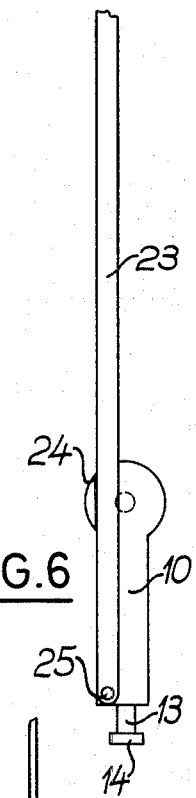
FIGS. 5 and 6 are front and side elevational views of a part of the device.

The solar heating device shown in FIG. 1 comprises a tubular post 1 including a rigid support member in the form of an arm 2 protruding perpendicularly from its upper end.

The lower end of post 2 is received in a relatively short tube 3 of larger diameter than post 2, and is fixed therein by means of a screw, not shown. Three legs 4, 5 and 6 are secured on tube 3 by means of respective collars 4', 5' and 6'. Collar 4' is fixed to tube 3; collars 5' and 6' are rotatably mounted thereon and are secured in an axial direction by means of a pin 7 which may also serve to support the lower end of post 1. The legs 4, 5 and 6 can thus be moved between a folded position (FIG. 8) in alignment with one another, and an opened-out position (FIGS. 1 and 2), disposed at about 120° to one another, in which they form a tripod for supporting tube 3 and hence post 1 in an upright position.

The arm 2 includes three discrete notches 8 spaced apart along an upper face thereof, notches 8 being arranged so that they can each receive and support a pivot 9 with the axis of the pivot disposed perpendicularly to both the axis of post 1 and to the longitudinal direction of arm 2. The pivot 9 itself protrudes perpendicularly from one face of an enlarged portion disposed towards one end of a substantially rectilinear rigid arm 10, and has a threaded outer end on which a nut 11 with an integral actuating lever is screwably engaged. A washer 10 is disposed about pivot 9 between arms 2 and 10.

The other end of arm 10 is extended by a shaft 13 the outer end of which has a tapped bore receiving a screw 14, by means of which a concave generally paraboloidal reflector 15 is secured with the arm 10 disposed along the direction of the axis of the reflector. Reflector 15 is made up of a plurality of flexible segments such as 16 and 17, for example of aluminium and having a polished reflecting surface. Modified segments 16',17' for a varied form of reflector are shown in FIG. 3. The narrower ends of the segments, each provided with a hole 18, are superposed so that the holes 18 may be passed about shaft 13; advantageously the holes 18 may be pivotally secured on a separate sleeve (not shown) which can in turn be fitted on shaft 13. The segments are thus foldable and unfoldable with a fan-like movement between a storage position (FIG. 8) in which they are superposed and an expanded position (FIGS. 1 and 2) in which the extreme segments 16, 17 meet together whereby the segments form a reflector. Full details of several manners of interconnecting the segments, for example by means of a flexible tape, to enable efficient folding and unfolding thereof, are given in the prior patents referred to above. The adjacent edges of the extreme segments 16, 17 which meet together in said unfolded position are provided with cut-out portions 19 defining an elongate aperture 20 for passage of post 1. The extreme segments 16, 17 are also provided, towards their outer ends, with means for securing the segments 16, 17 together in the expanded position. In the varied form of reflector shown in FIG. 3, these securing means include a cut-away portion of segment 16' which is bent to form a hook 21, and a plurality of slots 22 in segment 17' in which hook 21 can be selectively engaged to enable adjustment of the curvature of reflector 15 and hence of its focal point.

A rod 23 is removably fixed to arm 10 by means of an enlargement 24 on arm 10 defining a groove along the axial direction of reflector 15, said groove receiving and guiding rod 23 approximately along the axis of the reflector 15, and by means of a screw 25. The rod 23 has a length such that when it is fixed to arm 10, its free end 26 is located in the vicinity of the focal point of reflector 15 which, for the device of FIGS. 1 and 2, is fixed. When the modified form of reflector with a variable focal point is used, the free end 26 of rod 23 could lie in the vicinity of the focal point of the reflector when hook 21 is in the middle slot 22, or means could be provided for varying the effective length of rod 23 in correspondence with the particular slot in which hook 21 is engaged.

Figure 7:
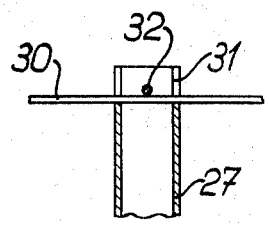
FIG. 7 is a cross-section through another part.
Figure 5:
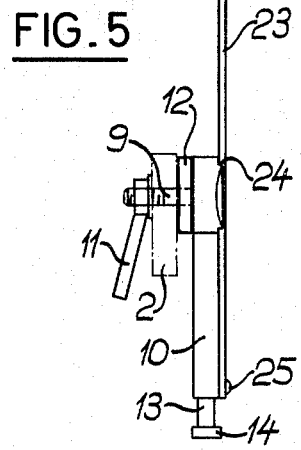

A tube 27 is slidably mounted within post 1 which carries a knurled screw 28 enabling the tube 27 to be fixed at a desired height. A grid 29 is pivotally mounted at the upper end of tube 27 by means of a cross-bar 30 (FIG. 7) which is held in a transverse slot 31 by means of a pin 32. Grid 29 also includes a pair of pivotally mounted arms 33 which, by engagement with a notch or similar means on tube 27, hold the grid substantially horizontal, i.e. in a plane perpendicular to the axis of tube 27. When the grid 29 is so fixed, it forms means for supporting an object to be heated and, in order to maintain such an object in the vicinity of the focal point or focus of reflector 15, it extends from tube 27 in a direction opposite to the direction along which arm 2 protrudes from tube 1. The grid 29 also includes a pair of longitudinal rods 34 defining therebetween an elongate central opening 35 generally perpendicular to tube 27; consequently, when the grid 29 is set at a suitable height and orientation by means of screw 28, this opening 35 lies along the trajectory of the end 26 of rod 23 when the reflector 15 is pivoted about pivot 9.

Figure 8:
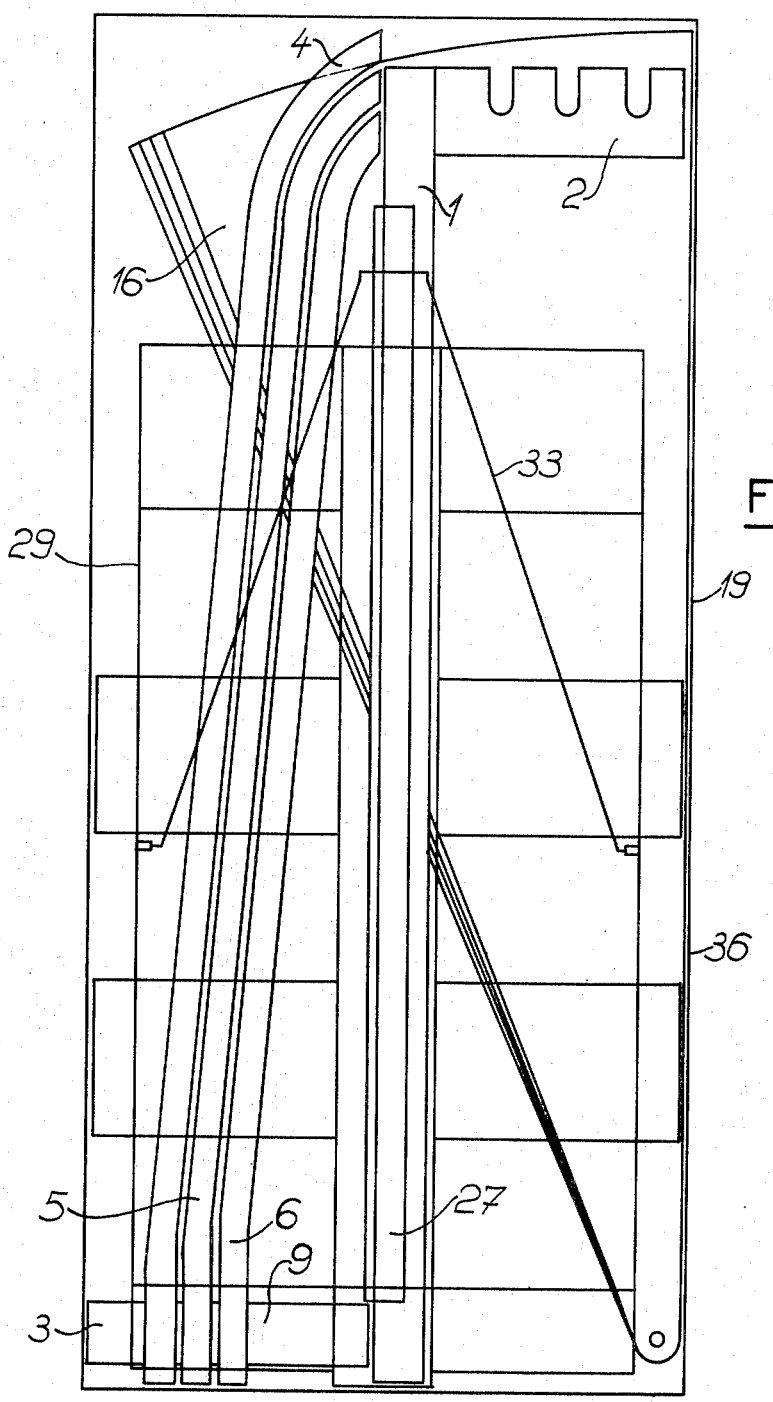
FIG. 8 is a schematic plan view showing an arrangement of parts of the dismantled device in a case for storage and transport.

The device can easily be dismantled and the parts are so dimensioned as to fit into a compact carrying and storage case 36, for example in the manner schematically indicated in FIG. 8. For this purpose, as can be seen from FIG. 8, the length of the sectors of the reflector 15 (i.e., the radius of the reflector) is conveniently about the same as the lengths of post 1, feet 4, 5 and 6, and tube 27. Likewise, the width of the wider ends of the sectors 15 is about the same as the width of grid 29. The arm 10, which is separated from the reflector 15 for the purposes of storage, is not shown in this figure.

Operation of the assembled device will now be described with reference to FIGS. 1 and 2.

When the sun is close to the zenith, the reflector 15 is oriented with its axis directed towards the sun, as indicated in FIG. 1. The pivot 9 is placed in the notch 8 nearest post 1, or the middle notch 8 as shown, since the focal point of reflector 15, indicated by end 26, is relatively close to the axis of post 1 and tube 27, the height of grid 29 being set to the height of end 26. However, the rod 26 is not only useful in facilitating the setting of the height of grid 29, but also serves to enable the axis of reflector 15 to be accurately oriented towards the sun. Once the orientation of reflector 15 has been set, the reflector can be locked in position by tightening nut 11.

As the sun changes position, the user can appropriately readjust the device. FIG. 2 shows a position sutiable for when the sun is lower in the sky. In this case, a compensation for the lateral displacement of the focal point of the reflector as it is pivoted to face the sun is achieved in two ways.

Firstly, the fact that pivot 9 is located between the center of reflector 15 and its focal point (26) provides a partial compensation since as the arm 10 is pivoted in the counterclockwise direction (looking at FIGS. 1 and 2), the center of reflector 15 is displaced towards the right. Secondly, the user can place the pivot 9 in the outermost notch 8, as shown. The grid 29 is also lowered to an appropriate level and set by means of screw 28. As can be seen on FIG. 2, the focal point of reflector 18 can be held in the vicinity of grid 29 for relatively great inclinations of reflector 15.

However, it is not necessary for the user to continuously adjust the device since he can arrange for the focus to remain in the vicinity of the grid 29 for an appreciable time as the sun moves in the sky. Indeed, it may often be sufficient to set the reflector 15 at an appropriate angle and, as the sun turns, merely turn tube 27 by loosening screw 28 in order to keep the focus in the vicinity of grid 29. A skilful user may also employ rod 29 to set the device with the focus at a certain distance from the focal point to ensure that as the sun moves the focus will describe a path, in the vicinity of grid 29, passing through or close to the focal point.

Many variations to the described device are possible. For example the reflector could be formed in two distinct semi-paraboloidal parts, as described in my U.S. Pat. No. 3,643,648. Also the reflector may be generally spherical or have any other concave form approximating a paraboloid.

What is claimed is:

1. A solar heating device comprising a post, a rigid support member extending transversally of the post, a concave generally paraboloidal reflector including a rigid arm extending along the axis of the reflector from the center thereof towards the focal point thereof, means for pivotally mounting said arm to said support member about a pivoting axis perpendicular to the axes of said post and said reflector whereby said reflector can be oriented relative to said post, said pivoting axis being spaced apart from the center of said reflector towards the focal point of said reflector, said post carrying towards an upper end thereof means for supporting an object to be heated, and means for adjusting the relative position of said object supporting means and said support member along the axial direction of said post.

2. A device according to claim 1, comprising a rod fixed at least approximately along the axis of the reflector, said rod including a free end disposed in the vicinity of the focal point of the reflector.

3. A device according to claim 2, in which said arm includes means defining a groove disposed along the axial direction of said reflector for receiving and guiding said rod, said rod being removably held in said groove means of said arm by means of a screw.

4. A device according to claim 2, in which said object supporting means is formed by a grid and means for securing said grid in a plane perpendicular to the axis of said post, said grid including means defining therein an elongate central opening extending generally perpendicularly to the axis of said post, and comprising means for relatively angularly disposing said grid and said support member about said post to place said opening means of said grid along the trajectory of said free end of said rod when the orientation of said reflector is modified by pivoting about said pivoting axis.

5. A device according to claim 1, comprising means for adjusting the position of said pivoting axis relative to said support member along a direction perpendicular to the axis of said post.

6. A device according to claim 4, in which said support member is formed by a fixed second arm protruding perpendicularly from said post, said second arm including means defining in an upper face thereof a plurality of discrete notches disposed spaced apart along said second arm, the pivotally mounted first arm of said reflector carrying a pivot protruding perpendicularly therefrom, and means for securing said first arm relative to said second arm with said pivot selectively disposed in one of said notch means and with said first arm at a selected inclination.

7. A device according to claim 6, in which said post is tubular and said object supporting means includes a grid pivotally mounted on a tube which is slidably mounted within said post, and means for holding said grid in a plane perpendicular to the axis of said post, said device further comprising means for fixing said tube relative to said post with said grid at a selected distance from said second arm and extending from said post in a direction opposite to the direction of said second arm.

8. A device according to claim 1, in which said reflector is made up of a plurality of segments pivotally jointed at corresponding one ends thereof about a shaft secured on said arm, said segments being foldable and unfoldable between a storage position in which the segments are superposed and an expanded position in which two extreme segments meet together whereby said segments form a generally paraboloidal reflector, adjacent edges of said extreme segments including means defining an aperture in said reflector for passage of said post.

9. A device according to claim 8, in which parts of said extreme segments which meet together in said expanded position include means for securing together said parts of said segments in selected positions to enable adjustment of the focal point of said reflector.

* * * * *